Feb. 6, 1968     E. M. TUCKER     3,367,726
ENDLESS TRACK UNIT FOR SNOW TRACTORS

Filed May 16, 1966     2 Sheets-Sheet 1

INVENTOR.
Emmitt M. Tucker
BY
Webster & Webster
ATTYS

Feb. 6, 1968  E. M. TUCKER  3,367,726
ENDLESS TRACK UNIT FOR SNOW TRACTORS
Filed May 16, 1966  2 Sheets-Sheet 2

United States Patent Office 3,367,726
Patented Feb. 6, 1968

3,367,726
ENDLESS TRACK UNIT FOR SNOW TRACTORS
Emmitt M. Tucker, Ashland, Oreg., assignor to Tucker & Sons, Grass Valley, Calif., a corporation of California
Filed May 16, 1966, Ser. No. 550,498
5 Claims. (Cl. 305—18)

ABSTRACT OF THE DISCLOSURE

An endless track unit for a tractor, designed so that the unit is equally effective when traversing snow or bare ground. A device is provided between the track unit supporting means and the unit itself which prevents stretching of the track unit when in operation.

---

A major object of this invention is to provide an endless track unit which when embodied in a snow tractor can—in the same trip—successfully traverse snow, then bare ground which may be muddy, and back onto snow without any adjustment or change of traction equipment being required.

The main snow-engaging member of the present track unit is an endless flexible belt of heavy duty material, and another important object of the invention is to provide novel guide means on the track unit which cooperates with the belt in a manner such that stretching thereof in use is prevented. Such means also functions to prevent lateral displacement of the endless belt upon steering movement of the tractor or operation of it on a sidehill; said means further assuring that the belt remains in engagement with the drive mechanism.

The present track unit includes a plurality of rubber-tired wheels, and an additional important object of the invention is to provide the track unit with a structure arranged so that the load is normally on such wheels and not on the aforesaid guide means.

A further object of the invention is to provide an endless track unit which is designed for ease and economy of manufacture.

A still further object of the invention is to provide a practical, reliable, and durable endless track unit and one which is exceedingly effective for the purpose for which it is designed.

These objects are accomplished by means of such structure and relative arrangement of parts as will fully appear by a perusal of the following specification and claims.

Figure 2:
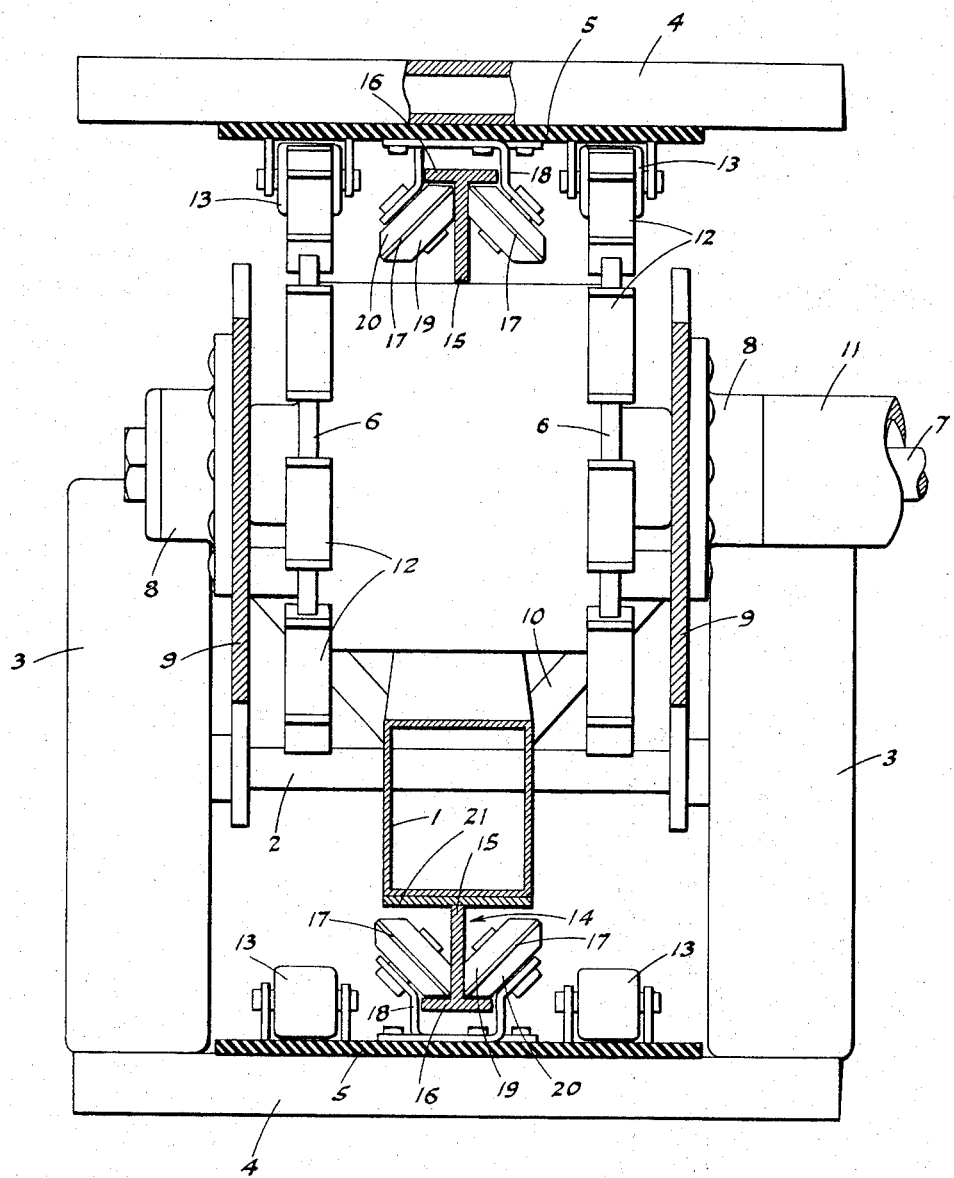
FIG. 2 is an enlarged cross section of the track unit, taken substantially on line 2—2 of FIG. 1.

Referring now more particularly to the drawings and to the characters of reference marked thereon, the endless track unit comprises an elongated rigid frame beam 1, preferably of rectangular hollow form, as shown in FIG. 2. This beam supports a plurality of longitudinally and substantially evenly spaced transverse axles 2, preferably four in number. The axles 2 project a considerable distance laterally out from the beam 1 on both sides thereof, and at their outer ends said axles support rubber-tired wheels 3 of conventional motor-vehicle form.

The wheels 3 ride on the end portions of rigid transversely extending ground-engaging cleats 4 which, while here shown as being of triangular hollow form in section, may be of different shapes as found to be the most suitable.

The cleats 4, which are relatively closely spaced, are fixed on and project outwardly from the outer face of an endless flexible track-forming belt 5 of heavy duty material; the belt being quite wide but with its side edges disposed just inwardly of the tires of the wheels 3, as shown in FIG. 2.

Figure 1:
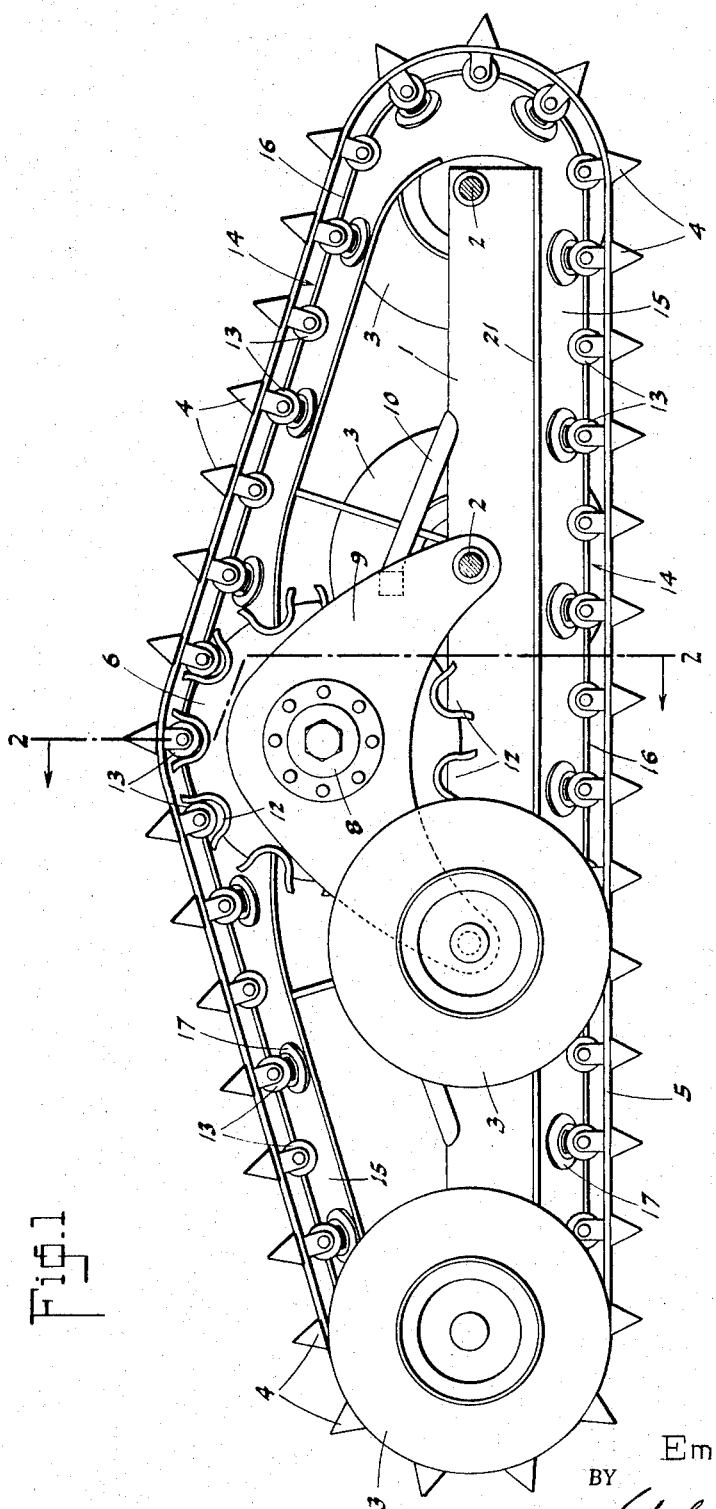
FIG. 1 is a side elevation of the improved track unit, with two of the wheels on the near side omitted.

The belt 5 curves concentrically about the axis of the endmost wheels 3 because of the engagement of said wheels with the outer end portions of the adjacent cleats 4; the belt sloping upwardly from said endmost wheels to a point substantially centrally of the length of the track unit, as shown in FIG. 1.

Positioned to drive the upper run of the track belt 5 at the topmost point thereof is a pair of transversely spaced sprockets 6; the spacing of said sprockets being somewhat less than the width of the belt. The sprockets 6 are mounted as a unit on a central drive shaft 7; said shaft being carried in suitable bearings 8 mounted on rigid vertical supporting plates 9. These plates are disposed between the sprockets 6 and the rows of wheels 3; the axles 2 of the central pairs of wheels being secured in the plates 9 in stiffening relation, and said plates being also braced from the beam 1 by longitudinal diagonal braces 10.

The shaft bearing 8 on the laterally inner side of the track unit is provided with a tubular elongation 11 through which the drive shaft 7 projects. This elongation is adapted to be mounted at its outermost end on one side of the frame of the snow tractor (not shown) and which includes the shaft driving motor thereon.

The sprockets 6 are each provided with a peripheral row of outwardly facing cradles or recesses 12, the bottom portions of which are of semicircular form. These recesses are spaced apart the same as the spacing of (and are adapted as the sprockets rotate to successively receive and fittingly engage) rollers 13 disposed in longitudinal rows on the inner face of belt 5. The rollers 13 are secured in connection with the various cleats 4, the spacing of which is the same as that of said rollers.

As will be understood from the foregoing description, the load—when the tractor is traveling in snow—is taken by the lower run of the cleated belt 5 which directly rests on the snow and then transfers to the wheels 3 through the cleats 4; the cleats, of course, also giving added traction to the belt. On the other hand, when the tractor is traversing bare ground, the load is in the main transferred to the wheels 3 directly from the cleats 4, thus taking much of the load-supporting strain off the belt 5. In either event, the load is normally, in end result, on the wheels 3.

In order to prevent possible stretching of the belt when being driven, and also to preclude lateral displacement of the belt from various causes, the following guide arrangement is provided:

Rigidly mounted on the beam 1 is an endless T-rail, indicated generally at 14, which extends symmetrically of the inner face of the belt 5 in adjacent but spaced relation thereto. Such T-rail is disposed equidistant to the side edges of the belt and comprises a vertical strip 15 having a corresponding portion secured centrally to the underside of the beam 1, and a cross strip 16 disposed parallel to and radially inward from the belt 5, as clearly shown in FIG. 1; the vertical strip 15 projecting from the cross strip 16 in a direction away from the belt.

Rollers 17, disposed with their axes at a 45 degree angle to the belt in a transverse plane, are mounted on brackets 18 secured to the belt 5 and cleats 4 on opposite sides of the T-rail 14; said rollers 17 being in transverse alignment with the rollers 13 but in alternating or staggered relation thereto.

Each roller 17 is formed on one side of its center of width with a frusto-conical portion 19; the peripheral face of which flatly engages the adjacent side of the T-rail vertical strip 15. Each roller 17 is also formed on the other side of said center of width with a similar frusto-conical portion 20 (which faces away from the portion 19) adapted to engage the adjacent face of the T-rail cross strip 16 or the lower face of a bearing strip 21 extending along and secured to the bottom of the beam 1 for its full length; the rollers 17 being spaced from the bearing strip 21 under normal conditions of operation.

With the foregoing arrangement of the T-rail and the diagonally disposed rollers 17, the belt 5 is positively prevented from stretching by reason of the engagement of the rollers with the cross strip 16. This is true regardless of the fact that foreign objects may pass between the wheels 3 and the cleats 4 on which such wheels ride, since the normally inflated tires may yield to a certain extent.

Should the tires become deflated or underinflated, the lower rollers 17 serve temporarily and run on the bearing strip 21 above the T-rail; said lower rollers then taking the load. This prevents possible damage being done to the tires of the wheels 3 and also prevents the belt 5 from rubbing against the bottom face of the T-rail, since the vertical space between the rollers 17 and the bearing strip 21 is less than the space between the cross strip 16 and the belt 5, as clearly shown in FIG. 2.

Also, when the tractor is being steered or traversing a sidehill course, the rollers 17 and cooperating T-rail 14 prevent lateral displacement of the belt 5 relative to the wheels and frame structure of the track unit. Further, by reason of the rollers 17 moving into contact with the T-rail cross strip 16 along the top portion of the belt 5, there is no possibility of the sprocket-engaging rollers 13 jumping out of the sprocket recesses 12 when the track is under heavy load, or if a foreign object passes therebetween.

From the foregoing description, it will be readily seen that there has been produced such an endless track unit as substantially fulfills the objects of the invention, as set forth herein.

While this specification sets forth in detail the present and preferred construction of the endless track unit, still in practice such deviations from such detail may be resorted to as do not form a departure from the spirit of the invention, as defined by the appended claims.

Having thus described the invention, the following is claimed as new and useful and upon which Letters Patent is desired:

1. An endless track unit comprising a longitudinal frame member, an endless track-forming belt extending about said member, means to drive the belt, rigid transverse cleats secured on the outer face of the belt and projecting laterally beyond both sides thereof, and a plurality of wheels supported from the frame member on both sides thereof and riding directly on the cleats; the belt drive means comprising a driven sprocket supported from the frame member under the upper run of the belt, the sprocket being formed with a circumferential row of recesses in its periphery, and a row of rollers mounted on the underside of the belt; said rollers being of a size and spacing to successively engage in the recesses.

2. An endless track unit comprising a longitudinal frame member, an endless track-forming belt extending about said member, means to drive the belt, rigid transverse cleats secured on the outer face of the belt and projecting laterally beyond both sides thereof, and a plurality of wheels supported from the frame member on both sides thereof and riding directly on the cleats; there being a pair of transversely spaced wheels at each end of the frame member; each such pair of wheels, with the cleats engaged thereby, guiding the belt in a turn relative to the lower run thereof; there being cooperating guide means mounted on the belt and frame member to prevent stretching of said belt.

3. An endless track unit comprising a longitudinal frame member, an endless track-forming belt extending about said member, means to drive the belt, rigid transverse cleats secured on the outer face of the belt and projecting laterally beyond both sides thereof, and a plurality of wheels supported from the frame member on both sides thereof and riding directly on the cleats; there being a pair of transversely spaced wheels at each end of the frame member; each such pair of wheels, with the cleats engaged thereby, guiding the belt in a turn relative to the lower run thereof, and cooperating guide means mounted on the belt and frame member to prevent stretching of said belt; said guide means comprising an endless T-rail supported from the frame member inwardly of but adjacent the belt, said T-rail being symmetrical to the belt and including a cross strip parallel to and spaced inwardly from said belt throughout the extent of the latter, and rollers secured on the inner face of the belt at spaced intervals along the same and engaging the face of the cross strip furthest from the belt.

4. A unit, as in claim 3, with a bearing strip secured on and extending along the frame member on the bottom thereof at a distance from the adjacent portion of the cross strip of the T-rail greater than the diameter of the rollers but adapted for engagement thereby upon disengagement of such rollers from the cross strip upon predetermined downward movement of the frame member relative to the belt.

5. An endless track unit comprising a longitudinal frame member, an endless track-forming belt extending about said member, means to drive the belt, rigid transverse cleats secured on the outer face of the belt and projecting laterally beyond both sides thereof, and a plurality of wheels supported from the frame member on both sides thereof and riding directly on the cleats; there being a pair of transversely spaced wheels at each end of the frame member; each such pair of wheels, with the cleats engaged thereby, guiding the belt in a turn relative to the lower run thereof, and cooperating guide means mounted on the belt and frame member to prevent stretching of said belt and lateral displacement thereof relative to the frame member; said guide means comprising an endless T-rail supported from the frame member inwardly of but adjacent the belt, said T-rail being symmetrical to the belt and including a cross strip parallel to and spaced inwardly from said belt throughout the extent of the latter and a central vertical strip extending away from the belt; and rollers secured on the inner face of the belt at intervals along the same and on both sides of the T-rail, said rollers being peripherally shaped to and adapted to engage the adjacent faces of the cross strip and central strip on both sides of the latter.

References Cited

UNITED STATES PATENTS

| | | | |
|---|---|---|---|
| 1,814,046 | 7/1931 | Kegresse | 305—35 |
| 1,957,477 | 5/1934 | Kegresse | 305—57 |
| 2,116,834 | 5/1938 | Kegresse | 305—35 |
| 2,561,716 | 7/1951 | Tucker | 305—18 |
| 3,111,349 | 11/1963 | Tucker | 305—18 |
| 3,250,577 | 5/1966 | Olson | 305—38 |

RICHARD J. JOHNSON, *Primary Examiner.*